Patented Oct. 29, 1940

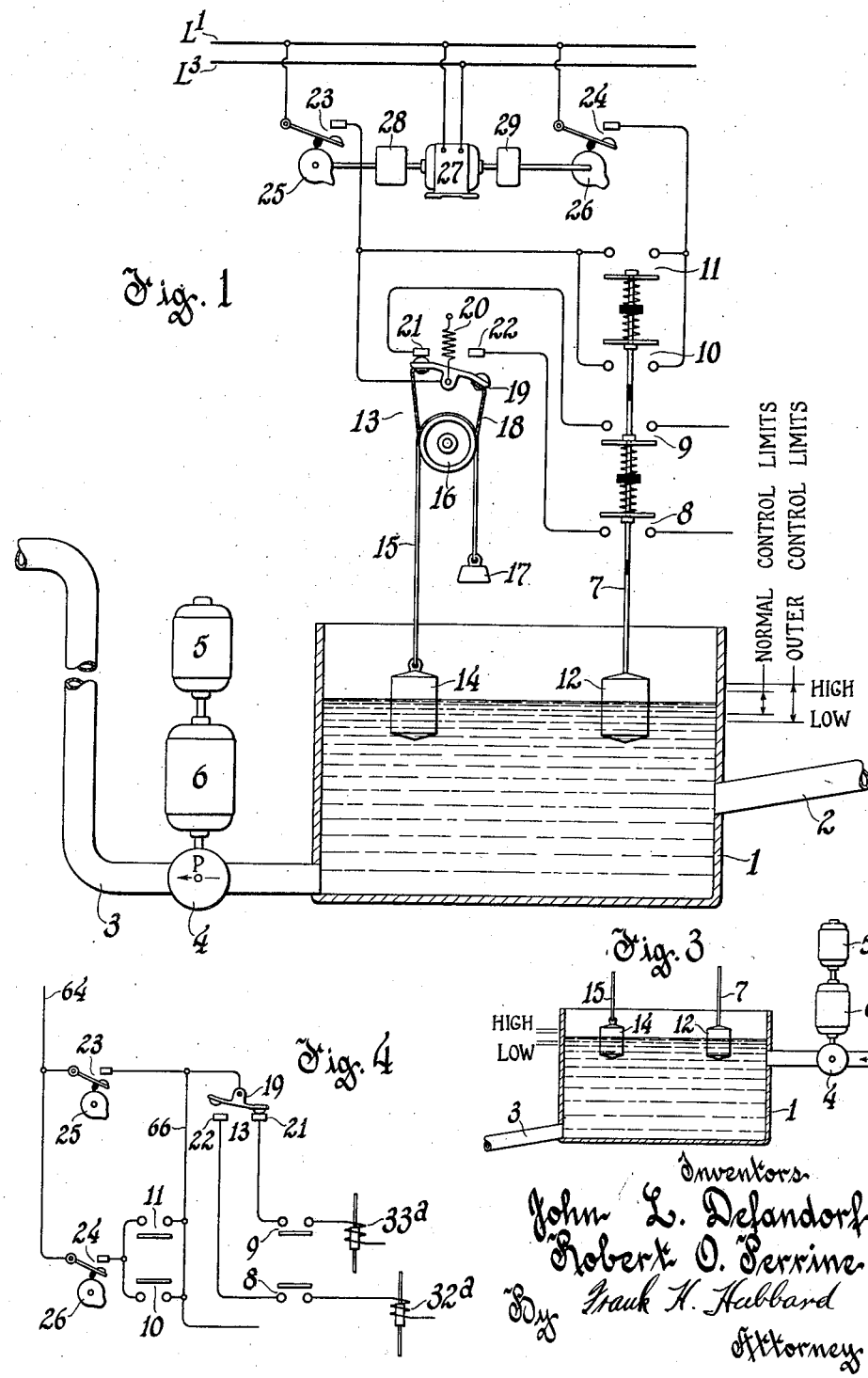

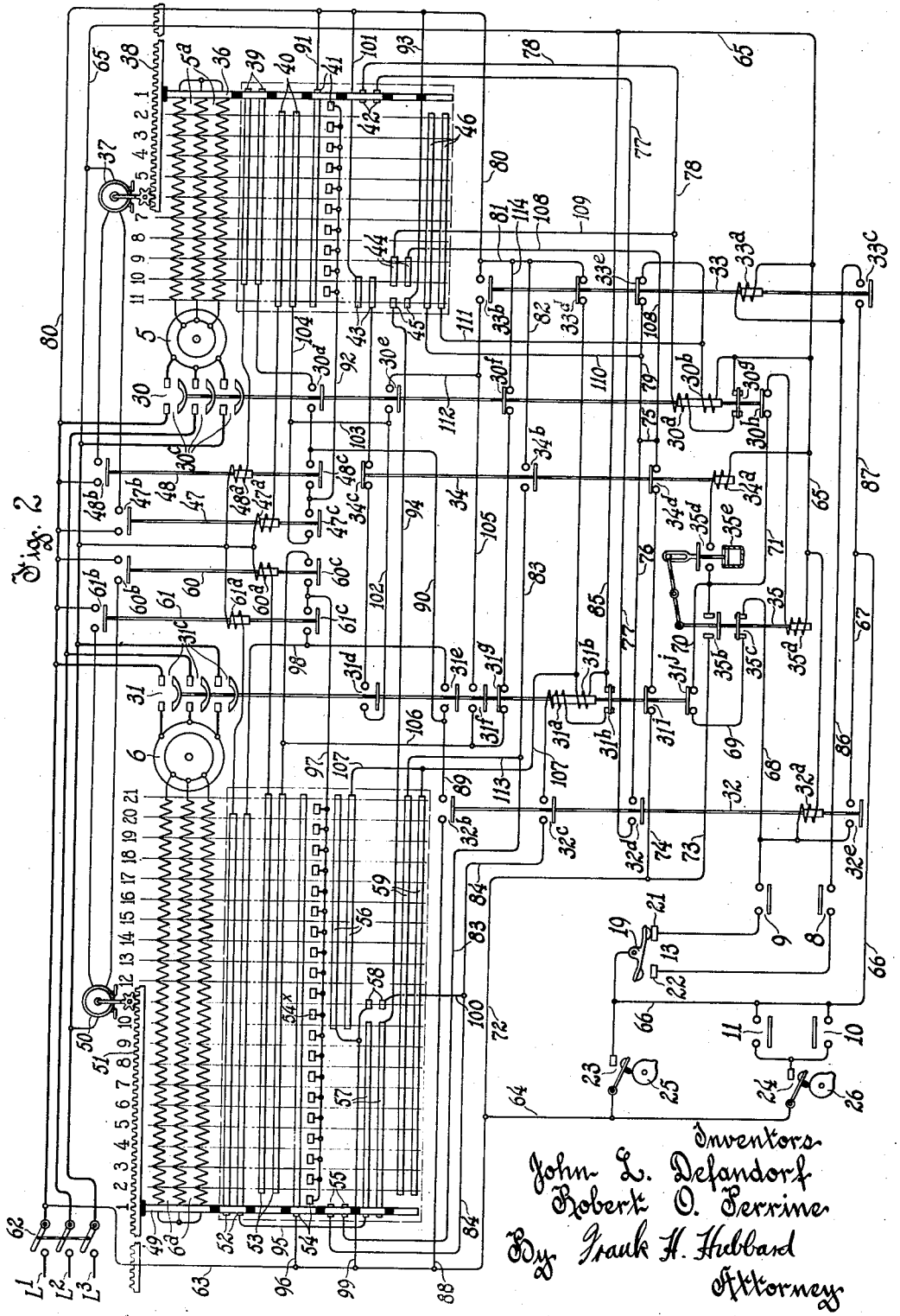

2,219,472

UNITED STATES PATENT OFFICE 2,219,472

FLUID FLOW CONTROLLING SYSTEM

John L. Defandorf, Whitefish Bay, and Robert O. Perrine, Wauwatosa, Wis., assignors to Cutler-Hammer, Inc., Milwaukee, Wis., a corporation of Delaware Application November 14, 1938, Serial No. 240,398

19 Claims. (Cl. 103—26)

This invention relates to fluid flow controlling systems, and more particularly to apparatus for regulating the volumetric rate of flow of a fluid in accordance with variations in the rate of supply of or demand for the fluid. While not limited thereto, the invention relates to a flow controlling system involving use of a float operated liquid level responsive device.

An object of the invention is to provide a system including a receiver for a fluid and pump operating means operable to provide different pumping rates to maintain a predetermined condition of the fluid in the receiver under conditions of variation in the rate of supply of or demand for the fluid.

Another object is to provide an improved system of the aforementioned character including pumping means and means whereby the output of said pumping means is varied automatically as the condition of the fluid in the receiver varies from a given condition.

A more specific object is to provide a flow controlling system including means responsive to variations in the level of the liquid in a receiver, whereby the output of the pumping means is progressively varied in accordance with the direction of change of the level in the receiver relative to a normal level and is maintained at its instant output value upon reversal in the direction of change of level pending departure of the level from said normal level in the opposite direction.

Another object is to provide a system of the aforementioned character including a plurality of pump motors of different maximum speeds operable in sequence and in given gradients throughout predetermined speed ranges under given conditions of variation in the liquid level.

Another object is to provide a system of the aforementioned character wherein transfer of the pump drive from one motor to another is effected automatically at predetermined substantially like speeds upon a given change in the liquid level in one direction, and wherein return transfer between the motors is effected at other predetermined substantially like speeds upon a given change in the liquid level in the other direction, to avoid excessive transfer between the motors upon fluctuation of the level of the liquid.

Other objects and advantages of the invention will hereinafter appear.

The accompanying drawings illustrate certain embodiments of the invention which will now be described; it being understood that the invention is susceptible of embodiment in other forms without departing from the spirit and scope of the invention as defined by the appended claims.

In the drawings,

Figure 1 illustrates schematically a typical arrangement with a sump or tank, in which the level of the liquid is to be controlled, of an inflow or supply conduit and an outflow conduit having a motor driven pump located therein, together with certain of the control elements of a float operated liquid level controlling system constructed in accordance with the invention.

Fig. 2 is a diagrammatic and schematic illustration of the liquid level controlling system which is operated by the control elements shown in Fig. 1.

Fig. 3 illustrates schematically a modification of the arrangement shown in Fig. 1, wherein the pump is located in the inflow conduit.

Fig. 4 is a fragmentary diagrammatic illustration showing a modification of the control system illustrated in Fig. 2 to adapt the latter for control of the pump motors in the arrangement shown in Fig. 3.

The system shown in Fig. 1 and hereinafter described, while not limited thereto, is particularly applicable for use in connection with sewage disposal plants or systems, wherein a collecting tank or sump is so situated in a community as to provide for flow of the liquid sewage from different sections of the community by gravity or other suitable means into the tank. The present arrangement provides for regulating the flow of liquid sewage from the tank to a sewage disposal plant by means of a variable speed motor driven pump, the pumping rate of which is controlled in accordance with variations in the level of liquid in the tank as affected by variations in the rate of flow of the liquid into the tank.

Referring first to Fig. 1, the numeral 1 designates a tank into which liquid, such as sewage, is discharged at a varying rate from a conduit 2. The liquid is pumped from tank 1, as to a sewage disposal plant, through a conduit 3 by a pump 4 at a rate dependent upon variation of the level of the liquid from certain predetermined limits as affected by variations in the rate of flow of the liquid from conduit 2. It is to be understood that tank 1 may be of relatively small size relative to the rate of flow, and in practice the rate of flow into the tank may vary from five million to fifteen million gallons a day, for example.

It is desirable to pump the liquid from tank 1 at a rate corresponding substantially with the rate of discharge of the liquid into said tank from conduit 2. Accordingly it is primarily desired to operate pump 4 at a speed which is just sufficient to maintain the level of the liquid in tank 1 within certain limits with respect to a predetermined normal level thereof.

Pump 4 is operable selectively at different speeds by one or the other of two motors 5 and 6. As shown, motor 5 is a relatively small motor and motor 6 is a relatively large motor, the same being rated, for example, at 200 H. P. and 450 H. P., and being operable at maximum speeds of substantially 750 R. P. M. and 900 R. P. M., respectively. Also motor 5 is normally adapted to operate pump 4 when the rate of flow of the liquid into tank 1 varies between that corresponding to a supply of five millions or less and that corresponding to a supply of ten millions of gallons a day, for example, and motor 6 is normally adapted to operate said pump when the rate of flow of the liquid into the tank varies between that corresponding to a supply of ten millions and that corresponding to a supply of fifteen millions of gallons a day, for example. The rotors of said motors are carried by a single shaft and said shaft is connected to the operating shaft of pump 4,—the rotor of the inactive motor being consequently rotated by the rotor of the active motor.

Each of the motors 5 and 6 is a variable speed motor, and as hereinafter more fully described, motor 5 starts and operates at its lowest speed upon rise of the liquid level in tank 1 to a predetermined normal "high" control limit. Thereafter, if the pumping rate which is afforded by the aforementioned low speed operation of motor 5 is insufficient to lower the liquid level or if the liquid level continues to rise, the speed of motor 5 is increased in finite increments, or in a step-by-step manner, at given intervals of time. If the liquid level is not lowered, or if it continues to rise, the speed of motor 5 is increased, in the manner aforestated, to its maximum speed. Thereafter operation of pump 4 is transferred from small motor 5 to large motor 6. The arrangement is such that motor 6, upon such transfer, starts at a speed approximating the maximum speed of motor 5. The speed of motor 6 is adapted to be increased from its starting to its maximum speed in the manner aforestated upon persistence of the aforementioned high liquid level, or upon continued rise thereof.

If at any time during operation of one or the other of said motors the liquid level tends to lower, increase in speed of the motor is stopped, and the motor operates at its instant speed pending rise of the liquid level or lowering thereof to a predetermined normal "low" control limit. When the latter condition occurs, the speed of the active motor is decreased in finite steps at given intervals of time. If small motor 5 is operating, the speed thereof is decreased until it is finally stopped. If large motor 6 is operating, the speed thereof is decreased to a predetermined degree which is less than the maximum speed of motor 5, and transfer of pump operation is thereafter effected at such speed from motor 6 to motor 5. This overlap in transfer speeds avoids an excessive number of transfers between the motors upon fluctuation of the liquid level. Following transfer of pump operation to motor 5 the speed of the latter is adapted to be decreased in the manner aforestated.

If at any time during the aforedescribed sequence of decrease in speed of one or the other of the motors the liquid level tends to rise, further decrease in speed of the active motor is stopped, and the motor continues to operate at its instant speed pending lowering of the liquid level or rising thereof to the aforesaid normal "high" control limit.

Provision is further made in the present system whereby if the liquid level rises to a predetermined outer "high" or outer "low" control limit the aforementioned sequences of increase or decrease in the speed of the motors are effected at considerably more frequent intervals of time.

The control system for motors 5 and 6 includes a float switch 7 which is provided with contacts 8, 9, 10 and 11. Contacts 8 and 9 are adapted to be in open position so long as the level of the liquid in tank 1 remains between the normal control limits indicated by the legend and arrows in Fig. 1, and contacts 10 and 11 are adapted to be in open position so long as the liquid level remains between the outer control limits, also indicated by the legend and arrows in Fig. 1. Said contacts are adapted to close selectively upon operation of a float 12 in accordance with variations in the liquid level with respect to said control limits. Thus contacts 8 and 9 are adapted to close when the liquid level reaches the normal "low" and normal "high" control limits, respectively—and contacts 10 and 11 are adapted to close when the liquid level reaches the outer "low" and outer "high" control limits, respectively.

For purposes of illustration float switch 7 is shown in a simplified form and it will be noted that the movable member of each of the contacts 8, 9, 10 and 11 is slidably mounted upon the float switch rod and is normally biased by an associated compression spring against a corresponding collar or shoulder carried by said rod. Thus upon given movements of float switch 7 said movable contact members are first moved into engagement with their associated stationary contacts and are thereafter adapted to slide with respect to said float switch rod against the action of said springs.

A second float operated switch 13 is adapted to operate in response to changes in the direction of variation of the level of the liquid in tank 1. Switch 13 is actuated by operation of a float 14 which is attached to one end of a rope 15 engaged with the periphery of a sheave 16, rope 15 having a counterweight 17 attached to its opposite end. A belt 18, having its ends attached to opposite ends respectively of a centrally pivoted contact member 19, frictionally engages the periphery of sheave 16, and said belt is made taut as by means of a tension spring 20 associated with the pivot of contact member 19. Contact member 19 is adapted to selectively engage its associated stationary contacts 21 and 22. Thus upon upward movement of float 14 sheave 16 is rotated in a clockwise direction causing tilting of contact member 19 into engagement with stationary contact 21, as shown. Continued upward movement of float 14 causes sheave 16 to slip with respect to belt 18. However, immediately upon downward movement of float 14 sheave 16 is rotated in a counterclockwise direction causing tilting of contact member 19 out of engagement with contact 21 and into engagement with contact 22. Switch 13 may be of the character disclosed in the patent to Clarence T. Evans, No. 1,964,199, dated June 26, 1934.

A pair of momentary contact switches 23 and 24 are adapted to be closed at predetermined intervals by means of cams 25 and 26 which are rotated by a continuously operating pilot motor 27. Suitable gear reduction, indicated at 28 and 29, provides for operation of cams 25 and 26, respectively, at relatively slow and relatively fast rates of rotation—the arrangement being such that switch 23 is closed for, say, one second at intervals of three minutes, and switch 24 is closed for, say, one second at intervals of thirty seconds. It will be noted that under given conditions switch 23 is connected in series with contacts 21 and 9 and under other given conditions with contacts 22 and 8. Switch 24, under given conditions, is connected in series with contacts 11, 21 and 9 and under other given conditions with contacts 10, 22 and 8.

Referring now to Fig. 2, the control system further includes a motor switch 30 for the small pump motor 5 and a motor switch 31 for the large pump motor 6. Switch 30 is provided with a closing winding 30$^a$ and a holding winding 30$^b$, a set of normally open contacts 30$^c$ which when closed establish power connections for motor 5, normally open contacts 30$^d$ and 30$^e$ and normally closed contacts 30$^f$, 30$^g$, and 30$^h$. Switch 31 is provided with a closing winding 31$^a$ and a holding winding 31$^b$, a set of normally open contacts 31$^c$ which when closed establish power connections for motor 6, normally open contacts 31$^d$, 31$^e$ and 31$^f$ and normally closed contacts 31$^g$, 31$^h$, 31$^i$ and 31$^j$.

A relay 32 is provided with an operating winding 32$^a$ which is energized under conditions hereinafter set forth only during closure of one or the other of momentary contact switches 23, 24. Relay 32 is provided with normally open contacts 32$^b$, 32$^c$, 32$^d$ and 32$^e$, and energization and operation of said relay controls starting and increase in speed of motor 5—also transfer of pump operation to motor 6 and increase in speed thereof.

A relay 33 is provided with an operating winding 33$^a$ which in a manner similar to that stated in connection with relay 32 is energized only during closure of one or the other of switches 23, 24. Relay 33 is provided with normally open contacts 33$^b$ and 33$^c$ and with normally closed contacts 33$^d$ and 33$^e$. Energization and operation of said relay 33 controls decrease in speed of the active motor 5 or 6, transfer of pump operation from motor 6 to motor 5, and stopping of motor 5.

Further control instrumentalities, the function and operation of which are hereinafter described, comprise the relays 34 and 35. Relay 34 is provided with an operating winding 34$^a$, normally open contacts 34$^b$ and normally closed contacts 34$^c$ and 34$^d$. Relay 35 is provided with an operating winding 35$^a$, normally open contacts 35$^b$ and normally closed contacts 35$^c$. Relay 35 has associated therewith the normally open contacts 35$^d$ which are adapted to be operated to closed position by the delaying action of a dash-pot 35$^e$ upon energization and operation of relay 35.

Motor 5 is shown as a polyphase alternating current induction motor having primary and secondary windings with external resistance 5$^a$ in circuit with the secondary winding. For purposes of illustration a movable crosshead 36 is shown as the means for commutating resistance 5$^a$ and means are provided for moving said crosshead in finite steps including a reversible split field pilot motor 37 operable through the medium of rack and pinion mechanism 38. Crosshead 36 is shown as provided with an extension to effect bridging engagement with the various sets of contacts 39 to 46, inclusive. Operation of pilot motor 37 in opposite directions is controlled by switches 47 and 48, respectively. Said switches are provided with operating windings 47$^a$ and 48$^a$, respectively, and with normally open contacts 47$^b$, 47$^c$ and 48$^b$, 48$^c$, respectively.

Motor 6 is similar in character to motor 5 and is provided with external resistance 6$^a$ in circuit with its secondary winding. Resistance 6$^a$ is commutated in finite steps upon movement of crosshead 49 by a reversible split field pilot motor 50 through the medium of rack and pinion mechanism 51. Crosshead 49 is provided with an extension to effect bridging engagement with the various sets of contacts 52 to 59, inclusive. Operation of pilot motor 50 in opposite directions is controlled by switches 60 and 61, respectively. Said switches are provided with operating windings 60$^a$ and 61$^a$, respectively, and with normally open contacts 60$^b$, 60$^c$ and 61$^b$, 61$^c$, respectively.

Motors 5 and 6 are supplied with current from a suitable source of alternating current supply represented by lines L$^1$, L$^2$ and L$^3$. A triple pole line switch 62 is provided for connecting the system to the source of supply. The operation and further details of construction of the system will now be described, with reference to Figs. 1 and 2.

Closure of line switch 62 connects the system to lines L$^1$, L$^2$ and L$^3$. Assuming that the various control instrumentalities of the system are in the positions thereof illustrated in the drawings, motors 5 and 6 are stopped. Assuming also that the level of the liquid in tank 1 is rising, the contactor 19 of switch 13 is tilted to engage contact 21, as shown. When the level of the liquid reaches the normal "high" control limit, contacts 9 of float switch 7 are closed. Thus upon momentary closure of switch 23 an energizing circuit is established for the operating winding 32$^a$ of relay 32, said circuit extending from line L$^1$ by conductors 63 and 64 (Fig. 2) through switch 23, contactor 19 and contact 21 of switch 13, contacts 9 of float switch 7 and said winding 32$^a$, and by conductor 65 to line L$^3$.

In order to prevent premature deenergization of relay 32 in the event of vibration or bouncing of contactor 19, a maintaining circuit is provided for winding 32$^a$, said circuit extending from line L$^1$ by conductors 63 and 64 through switch 23, by conductors 66 and 67 through contacts 32$^e$ and winding 32$^a$ of relay 32, and by conductor 65 to line L$^3$.

Also upon the aforementioned momentary closure of switch 23 an energizing circuit is established for the operating winding 35$^a$ of relay 35, said circuit extending from line L$^1$ through contacts 9, as previously traced, by conductor 68 through normally closed contacts 35$^c$ of relay 35, by conductor 69 through normally closed contacts 31$^j$ of switch 31, by conductors 70 and 71 through normally closed contacts 30$^h$ of switch 30 and said winding 35$^a$, and by conductor 65 to line L$^3$. Relay 35 tends to maintain itself energized by a circuit extending from line L$^1$ by conductors 63, 72 and 73 through contacts 35$^b$ of relay 35, by conductor 71 through contacts 30$^h$ and winding 35$^a$, and by conductor 65 to line L$^3$.

Upon operation of relay 32 an energizing circuit is established for the closing winding 30$^a$ of motor switch 30, said circuit extending from line L$^1$ by conductors 63, 72 and 74 through normally closed contacts 31$^i$ of switch 31 and normally closed contacts 34ᵈ of relay 34, by conductors 75 and 76 through contacts 32ᵈ of relay 32, by conductor 77 through contacts 42 (bridged by crosshead 36), by conductor 78 through said winding 30ᵃ and normally closed contacts 30ᵍ, and by conductor 65 to line L³. Operation of motor switch 30 establishes power connections for motor 5 through closure of contacts 30ᶜ. Motor 5 thereupon runs at its slowest speed, crosshead 36 being in its position "1", as shown in Fig. 2.

Upon operation of switch 30, its normally closed contacts 30ᵍ are opened to interrupt the energizing circuit for closing winding 30ᵃ. Also when switch 23 opens, the energizing circuit for winding 32ᵃ of relay 32 is interrupted with consequent opening of contacts 32ᵈ. However, switch 30 is maintained closed by its holding winding 30ᵇ which is energized by a circuit extending from line L¹ through contacts 34ᵈ of relay 34, as previously traced, by conductors 75 and 79 through normally closed contacts 33ᵉ of relay 33 and said winding 30ᵇ, and by conductor 65 to line L³.

Opening of contacts 30ʰ upon operation of switch 30 interrupts the energizing circuit for winding 35ᵃ of relay 35. However, if switch 30 fails to operate, relay 35 remains energized through contacts 30ʰ, and contacts 35ᵈ of relay 35 will close after a given interval by action of dashpot 35ᵉ. An energizing circuit is thus established for the winding 34ᵃ of relay 34, extending from line L¹ by conductors 63, 72 and 73 through contacts 35ᵇ, 35ᵈ of relay 35 and said winding 34ᵃ, and by conductor 65 to line L³. Operation of relay 34 opens contacts 34ᵈ, preventing operation of switch 30.

Upon subsequent momentary closure of switch 23 relay 32 operates to establish an energizing circuit for the closing winding 31ᵃ of motor switch 31, extending from line L¹ by conductors 80, 81 and 82 through contacts 34ᵇ of relay 34, by conductor 83 through contacts 55 (bridged by crosshead 49), by conductor 84 through contacts 32ᶜ, winding 31ᵃ, normally closed contacts 31ʰ, and by conductors 85 and 65 to line L³.

Switch 31 is maintained closed upon opening of contacts 31ʰ and 32ᶜ by its holding winding 31ᵇ, the energizing circuit for which extends from line L¹ by conductors 80 and 81 through normally closed contacts 33ᵈ of relay 33 and winding 31ᵇ, and by conductors 85 and 65 to line L³. Operation of motor switch 31 establishes power connections for motor 6 through closure of contacts 31ᶜ. Motor 6 thereupon runs at its slowest speed, crosshead 49 being in its position "1", as shown in Fig. 2.

It will be apparent from the foregoing that the system insures slow speed operation of pump 4 by motor 6 in the event of failure of operation of motor switch 30.

However, assuming that switch 30 operates normally, motor 5 will run at its slowest speed, as aforedescribed. If the slow pumping rate thus provided is sufficient to lower the liquid level, contactor 19 of switch 13 is tilted by downward movement of float 14 out of engagement with contact 21 and into engagement with contact 22. If the liquid level is within the normal control limits, contacts 8 and 9 of float switch 7 will be open and closure of switch 23 can effect no change in the operation of the system. In other words, operation of pump 4 is continued at the slow rate aforementioned.

If the level of the liquid is lowered to the normal "low" control limit, contacts 8 of float switch 7 close to establish an energizing circuit for operating winding 33ᵃ of relay 33 upon momentary closure of switch 23, said circuit extending from line L¹ by conductors 63 and 64 through switch 23, contactor 19 and contact 22 of switch 13 and contacts 8 of float switch 7, by conductor 86 through winding 33ᵃ, and by conductor 65 to line L³. In a manner similar to that described in connection with relay 32, a maintaining circuit is established for winding 33ᵃ (to prevent accidental deenergization thereof due to vibration or "bouncing" of contactor 19 with respect to contact 22), pending opening of switch 23, said circuit extending from line L¹ through switch 23, as traced, by conductors 66 and 87 through contacts 33ᶜ and winding 33ᵃ, and by conductor 65 to line L³. Upon operation of relay 33 contacts 33ᵉ open to interrupt the energizing circuit for holding winding 30ᵇ, whereupon motor switch 30 drops out to interrupt power connections to motor 5.

If under the conditions hereinbefore described, motor 6 is running at its slowest speed, operation of relay 33 opens contacts 33ᵈ to interrupt the energizing circuit for holding winding 31ᵇ, whereupon motor switch 31 drops out to interrupt power connections to motor 6.

Assuming, however, that motor 5 is running at its slowest speed, as aforedescribed, and further assuming that the level of the liquid remains substantially at the normal "high" control limit or continues to rise, contacts 9 of float switch 7 remain closed and momentary closure of switch 23 effects momentary operation of relay 32 in the manner aforedescribed. An energizing circuit is thus established for operating winding 48ᵃ of pilot motor switch 48, extending from line L¹ by conductors 63 and 88 through contacts 32ᵇ of relay 32, by conductors 89 and 90 through contacts 30ᵈ of switch 30, contacts 39 (bridged by crosshead 36) and winding 48ᵃ to line L³.

Operation of switch 48 closes contacts 48ᵇ to connect pilot motor 37 across lines L¹ and L³, whereupon motor 37 operates in a direction to move crosshead 36 to the left from its position "1" to its position "2". The arrangement is such that crosshead 36 is moved sufficiently during closure of contacts 32ᵇ to engage the first of the step-by-step contacts of the set designated generally by numeral 41, so that upon opening of contacts 32ᵇ operating winding 48ᵃ of switch 48 is maintained energized until crosshead 36 reaches its position "2" by a circuit extending from line L¹ by conductors 80 and 91 through contacts 41, by conductor 92 through contacts 48ᶜ, 30ᵈ and 39 and through said winding 48ᵃ to line L³. Thus one step of the secondary resistance 5ᵃ of motor 5 is short circuited and the speed of motor 5 is accordingly increased, accelerating the pumping rate.

If the liquid level remains sufficiently high or continues to rise, each momentary closure of switch 23 effects operation of switch 48 in the manner described, to effect step-by-step movement of crosshead 36 to the left by pilot motor 37 and thus to increase the speed of motor 5.

If the liquid level rises sufficiently to reach the outer "high" control limit, contacts 11 of float switch 7 are closed to render momentary contact switch 24 effective. As hereinbefore stated, switch 24 is arranged to close at considerably shorter intervals than switch 23. Thus by subjecting the energizing winding 48ᵃ of switch 48 to control by switch 24 said pilot motor switch 48 will be operated at more frequent intervals to hasten the increase in speed of motor 5. It will be noted that contacts 11 and switch 24 provide a connection to switch 13 which parallels switch 23.

When crosshead 36 reaches its position "11" motor 5 will operate at its maximum speed. In this position crosshead 36 bridges contacts 45, thus establishing an energizing circuit for the operating winding 61ª of pilot motor switch 61, said circuit extending from line L¹ by conductors 80 and 93 through contacts 45, by conductor 94 through contacts 57 (bridged by crosshead 49), by conductor 95 through contacts 52 and through said winding 61ª to line L³.

Operation of switch 61 closes contacts 61ᵇ to connect pilot motor 50 across lines L¹, L³, whereupon motor 50 operates in a direction to move crosshead 49 toward the right. It will be noted that switch 61 is energized during engagement of crosshead 49 with contacts 57. Thus crosshead 49 is moved continuously until it is beyond its position "10" wherein it disengages contacts 57 and engages one of the step-by-step contacts 54ˣ of set 54, whereby switch 61 is maintained energized and movement of crosshead 49 is continued into its position "11" wherein it disengages said step-by-step contact 54ˣ of set 54.

The aforementioned maintaining circuit for switch 61 extends from line L¹ by conductors 63 and 96 through contacts 54 (including 54ˣ), by conductor 97 through contacts 61ᶜ, by conductor 98 through contacts 52 and winding 61ª to line L³. In its position "11" crosshead 49 bridges contacts 58.

Thereafter, if the liquid level is not lowered or is still rising,—each subsequent momentary closure of switch 23 or switch 24, depending upon whether contacts 9 or both contacts 9 and 11 of float switch 7 are closed, results in momentary operation of relay 32.

Pilot motor switch 43 cannot operate upon closure of contacts 32ᵇ since crosshead 36 is disengaged (in its position "11") from contacts 39.

Thus operation of relay 32 establishes an energizing circuit for the closing winding 31ª of motor switch 31, extending from line L¹ by conductors 63 and 99 through contacts 58, by conductors 100 and 84 through contacts 32ᶜ, winding 31ª and contacts 31ʰ, and by conductors 85 and 65 to line L³. Closing winding 31ª is deenergized upon opening of either of the contacts 31ʰ or 32ᶜ, but the holding winding 31ᵇ is energized in the manner hereinbefore described.

Operation of switch 31 establishes power connections to motor 6 through closure of contacts 31ᶜ, whereupon motor 6 runs at a speed corresponding substantially to the maximum speed of motor 5 (with crosshead 49 in its position "11"). Opening of contacts 31ⁱ interrupts the energizing circuit for the holding winding 30ᵇ of motor switch 30, which drops out to deenergize motor 5. Opening of contacts 31ʲ prevents energization of the operating winding 35ª of relay 35.

Thereafter, upon momentary operation of relay 32, an energizing circuit is established for the operating winding 61ª of pilot motor switch 61, extending from line L¹ by conductors 63 and 88 through contacts 32ᵇ, by conductor 89 through contacts 31ᵉ, by conductor 98 through contacts 52 and winding 61ª to line L³. Operation of switch 61 closes contacts 61ᵇ to connect pilot motor 50 across lines L¹ and L³, whereupon motor 50 operates in a direction to move crosshead 49 toward the right from its position "11" to its position "12".

In a manner similar to that described in connection with crosshead 36, relay 61 is maintained energized, upon opening of contacts 32ᵇ, by a circuit extending from line L¹ by conductors 63 and 96 through the step-by-step contact of set 54 which is between positions "11" and "12", by conductor 97 through contacts 61ᶜ, by conductor 98 through contacts 52 and winding 61ª to line L³.

Thus upon each momentary operation of relay 32 pilot motor switch 61 closes to effect operation of pilot motor 50 to move crosshead 49 toward the right by one position and thereby to increase the speed of motor 6. If crosshead 49 finally reaches its position 21, motor 6 will operate at its maximum speed. It will be noted that in this position crosshead 49 does not bridge contacts 52, so that further operations of relay 32 can not effect closure of switch 61.

If at any time during the aforedescribed sequence of operations; i. e., operations which provide for increase in speed of the motors and transfer of pump operation from motor 5 to motor 6,—the liquid level begins to fall, contactor 19 of switch 13 is immediately caused to tilt, upon downward movement of float 14, to disengage contact 21 and to engage contact 22. Thus even though the level of the liquid is sufficiently high to effect closure of contacts 9, or both the latter and contacts 11, no further adjustment to increase the speed of the operating motor can be effected, pending subsequent rise of the liquid level, when contactor 19 would again be caused to engage contact 21.

If at the time when operation of pump 4 should be transferred from motor 5 to motor 6, motor switch 31 should fail to operate, motor switch 30 is maintained closed by its holding winding 30ᵇ, the energizing circuit for which extends through the normally closed contacts 31ⁱ, 34ᵈ and 33ᵉ, as previously traced, and motor 5 accordingly continues to operate at maximum speed, pending operation of switch 31, or lowering of the liquid level.

Assuming, however, that switch 31 operates normally, transfer of pump operation from motor 5 to motor 6 will be effected, as aforedescribed, and an energizing circuit is thereupon established for the operating winding 47ª of pilot motor switch 47, which extends from line L¹ by conductors 80 and 101 through contacts 43 (bridged by crosshead 36 in position "11"), through contacts 34ᶜ and 31ᵈ, by conductors 102, 103 and 104 through contacts 48 and winding 47ª to line L³.

Operation of switch 47 closes contacts 47ᵇ to connect pilot motor 37 across lines L¹ and L³. Motor 37 operates in a direction to move crosshead 36 toward the right,—and it will be noted that switch 47 will be energized through the medium of contacts 43 and crosshead 36 until the latter is moved beyond its position "10", where it will engage the step-by-step contact of set 41 which is between positions "10" and "9". Thus switch 47 is maintained energized until crosshead 36 is moved to its position "9" by a circuit extending from line L¹ by conductors 80 and 91 through said contacts 41, by conductor 92 through contacts 47ᶜ, by conductor 104 through contacts 48 and winding 47ª to line L³. Crosshead 36 in its position "9" bridges contacts 44.

By means of the arrangement aforedescribed it will be apparent that excessive transfer of pump operation between motors 5 and 6 is avoided upon such fluctuation of the liquid level as to cause movement of crosshead 49 between its position "10" and higher positions. In other words, transfer of pump operation from motor 5 to motor 6 is adapted to be effected when crosshead 36 reaches its position "11". Thereupon crosshead 49 is adapted to be moved automatically from its position "1" to its position "11", and motor 6 is thereafter adapted to be started at the speed corresponding to such position of crosshead 49. When motor 6 is energized motor 5 is deenergized, and crosshead 36 is thereupon moved automatically from its position "11" to its position "9". As hereinafter described, transfer of pump operation from motor 6 to motor 5 is effected when crosshead 49 is moved to its position "9".

Assuming now that the liquid level conditions have been such as to require operation of motor 6 at its maximum speed, that is, crosshead 49 will have been moved to its position "21". Immediately upon lowering of the liquid level, the resultant downward movement of float 14 will cause contactor 19 of switch 13 to disengage contact 21 and engage contact 22.

Motor 6 will continue to operate at its maximum speed until the liquid level falls to the normal "low" control limit, shown in Fig. 1, at which time float 12 will have moved downwardly to effect closure of contacts 8 of float switch 7. Thereafter upon closure of switch 23, relay 33 operates to establish an energizing circuit for operating winding 60$^a$ of pilot motor switch 60, which extends from line L$^1$ by conductor 80 through contacts 33$^b$, by conductor 105 through contacts 31$^f$, by conductor 106 through contacts 53 and winding 60$^a$ to line L$^3$.

Operation of switch 60 effects operation of pilot motor 50 in a direction to move crosshead 49 toward the left from position "21" to position "20". Switch 60 is maintained energized upon opening of contacts 33$^b$ until crosshead 49 is moved to position "20" by a circuit extending from line L$^1$ by conductors 63 and 96 through the contact of set 54 which is between positions 21 and 20, by conductor 97 through contacts 60$^c$ and 53 and through winding 60$^a$ to line L$^3$.

Thereafter, upon each operation of relay 33, crosshead 49 is moved toward the left by one position to decrease the speed of motor 6. If the liquid level falls to the outer "low" control limit, contacts 10 of float switch 7 will be closed to render switch 24 effective, whereupon the speed of motor 6 is decreased more rapidly.

It will be noted that when crosshead 49 is in any of its positions "10" to "21" it bridges contacts 56, thus providing an alternative energizing circuit for the holding winding 31$^b$ for that which is otherwise provided through contacts 33$^d$ of relay 33. Said circuit extends from line L$^1$ by conductors 63 and 99 through contacts 56, by conductor 107 through winding 31$^b$, and by conductors 85 and 65 to line L$^3$.

When crosshead 49 has been moved toward the left into its position "9" it disengages contacts 56, but not before relay 33 is deenergized, so that holding winding 31$^b$ is maintained energized through normally closed contacts 33$^d$. Upon subsequent operation of relay 33 contacts 33$^d$ are opened to deenergize holding winding 31$^b$, whereupon switch 31 drops out to stop motor 6. An energizing circuit is established simultaneously for closing winding 30$^a$ of switch 30 which extends from line L$^1$ by conductors 63, 72 and 74 through contacts 31$^i$ and 34$^d$, by conductor 108 through contacts 44 (bridged by crosshead 36 in its position "9"), by conductors 109 and 78 through winding 30$^a$ and contacts 30$^g$, and by conductor 65 to line L$^3$. Upon opening of contacts 30$^g$ switch 30 is maintained closed by holding winding 30$^b$, the energizing circuit for which extends from line L$^1$ by conductors 63, 72 and 74 through contacts 31$^i$ and 34$^d$, by conductors 75, 79 and 110 through contacts 46, by conductor 111 through winding 30$^b$, and by conductor 65 to line L$^3$. Operation of switch 30 establishes power connections for motor 5, which thereupon operates pump 4 at a speed in accordance with that provided by crosshead 36 in position "9".

Thereafter crosshead 36 is moved toward the right by one position to decrease the speed of motor 5 upon each operation of relay 33. The energizing circuit for operating winding 47$^a$ of pilot motor switch 47 may be traced from line L$^1$ by conductor 80 through contacts 33$^b$, by conductors 105 and 112 through contacts 30$^e$, by conductors 103 and 104 through contacts 40 and winding 47$^a$ to line L$^3$. Winding 47$^a$ is maintained energized during movement of crosshead 36 between its respective positions through contacts 47$^c$ and 41 in the manner aforedescribed. If the liquid level continues to lower or does not rise, the speed of motor 5 is decreased, and said motor is finally deenergized.

If, on the other hand, the liquid level rises following transfer of pump operation from motor 6 to motor 5, the speed of motor 5 is increased to the maximum speed thereof, whereupon crosshead 49, which was last moved to its position "9", is caused to move from such position to position "11", and transfer of pump operation is thereafter effected from motor 5 to motor 6. Thereafter, the system operates automatically in the manner aforedescribed to increase or to decrease the speed of the operating motor, to effect transfer of the pump drive from one motor to the other or to deenergize the active motor and thus stop the pumping operation.

If under conditions hereinbefore described,— i. e., upon failure of switch 30 to operate,—motor 6 is started at its lowest speed and is adapted to be operated throughout its full speed range, crosshead 49 bridges contacts 59 in its positions "2" to "21". As hereinbefore pointed out, relay 34 operates under the conditions last mentioned, and its contacts 34$^b$ and said contacts 59 insure energization of holding winding 31$^b$ during decrease in speed of motor 6 upon opening of contacts 33$^d$. Said circuit extends from line L$^1$ by conductors 80, 81 and 82 through contacts 34$^b$, by conductors 83 and 113 through contacts 59, by conductor 107 through winding 31$^b$ and by conductors 85 and 65 to line L$^3$.

It should be noted that when motor 5 is stopped after having been decelerated to its lowest speed, crosshead 49 is moved automatically from its position "9" (transfer position) to its position "1", to thereby insure starting of motor 6 at its lowest speed in the event of failure of motor switch 30 to operate. Thus pilot motor switch 60 is operated when motor switch 30 drops out to effect operation of pilot motor 50, whereby to effect such movement of crosshead 49. The energizing circuit for winding 60$^a$ of switch 60 extends from line L$^1$ by conductors 80, 81 and 114 through normally closed contacts 30$^f$ and normally closed contacts 31$^g$, by conductor 106 through contacts 53 and winding 60$^a$ to line L$^3$. Contacts 53 terminate at position "2", but winding 60$^a$ is maintained energized until crosshead 49 is moved to position "1", the circuit therefor extending through the first of the step-by-step contacts of set 54 and contacts 60° in the manner hereinbefore described.

While the pump motors 5 and 6 are shown herewith as arranged for operating a single pump selectively, it is to be understood that other suitable arrangements may be employed. For example, it is apparent that said motors may be arranged to each drive a pump located respectively in separate outflow conduits.

Also it will be apparent to those skilled in the art that the present system is readily applicable to an arrangement wherein the motors 5 and 6 operate a pump (as shown in Fig. 3, or pumps located in inflow conduits) at a variable rate to maintain the level of the liquid in tank I within predetermined limits depending upon the rate of outflow or demand for the liquid.

In adapting the control system shown in Fig. 2 to the arrangement shown in Fig. 3, it is obvious that the only change which is necessary is to reverse the connections from the float switch contacts to the operating windings of relays 32 and 33. Thus as shown in Fig. 4, contacts 8 of float switch 7 are adapted to be connected in circuit with the operating winding 32ª of relay 32 and contacts 9 are adapted to be connected in circuit with the operating winding 33ª of relay 33.

Thus upon a predetermined lowering of the liquid level, motor 5 will be started at low speed to pump liquid into tank I. Upon persistance of such low level or continued lowering thereof, the speed of motor 5 is increased, transfer is effected from motor 5 to motor 6, and the speed of the latter increased. The reverse of this operation is, of course, effected upon rise of the liquid level.

Also it is obvious that a constant speed motor might be employed for driving pump 4 with the provision of means to vary the capacity of said pump, such as a variable speed transmission interposed between motor and pump; such transmission to be adjusted automatically by a control system substantially like that herein disclosed.

What we claim as new and desire to secure by Letters Patent is:

1. In combination, a conduit for conducting a varying flow of fluid, a storage receiver interposed in said conduit, variable speed pumping means for controlling the flow of fluid through said receiver, means to vary the speed of said pumping means in a multiplicity of steps, said means including means responsive to the quantity of fluid in said receiver, associated means substantially immediately responsive to reversal in the direction of variation in the quantity of fluid in said receiver, and means responsive to the two last mentioned means to control said speed varying means.

2. In combination, a conduit for conducting a varying flow of fluid, a storage receiver interposed in said conduit, variable capacity pumping means in said conduit for controlling the flow of fluid through said receiver, means to vary the capacity of said pumping means, means to control said last mentioned means including means whereby to progressively vary in a multiplicity of steps the capacity of said pumping means in accordance with the direction of variation in the quantity of fluid in said receiver relative to a normal quantity, and associated means substantially instantaneously operable upon reversal in the direction of variation in the quantity of fluid in said receiver to at least temporarily maintain the capacity of said pumping means at its instant value.

3. In combination, a conduit for conducting a varying flow of fluid, a storage receiver interposed in said conduit, variable speed pumping means in said conduit for controlling the flow of fluid through said receiver, means to vary the speed of said pumping means, control means for said last mentioned means including means whereby to progressively vary in a multiplicity of steps the speed of said pumping means in accordance with the direction and degree of variation in the quantity of fluid in said receiver relative to a normal quantity, and associated means substantially instantaneously operable upon reversal in the direction of variation in the quantity of fluid in said receiver to maintain the speed of said pumping means at its instant value pending further variation in the quantity of fluid in either direction with respect to said normal quantity.

4. In a fluid flow controlling system, in combination, a conduit for conducting a varying flow of fluid, a storage receiver interposed in said conduit, means for controlling the flow of fluid through said receiver in accordance with variations in the condition of the fluid in said receiver relative to a given normal condition, said means comprising variable delivery pumping means in said conduit, means to vary the rate of delivery of said pumping means throughout a predetermined range, and means to control said last mentioned means including means responsive to variations in the condition of the fluid in said receiver, associated means responsive to reversal in the direction of variation in the condition of the fluid in said receiver, and means responsive to the two last mentioned means to effect in a continuous multiplicity of steps a progressive increase or decrease in the rate of delivery of said pumping means upon and in accordance with the direction of variation in the condition of the fluid in said receiver relative to said given normal condition, said last mentioned means including means whereby to maintain the instant rate of delivery of said pumping means upon reversal in the direction of variation in the condition of the fluid in said receiver pending further variation of the fluid condition with respect to said given normal condition in either direction.

5. In a fluid flow controlling system, in combination, a conduit for conducting a varying flow of fluid, a storage receiver interposed in said conduit, means for controlling the flow of fluid through said receiver in accordance with variations in the quantity of fluid in said receiver relative to a normal quantity, said means comprising variable speed pumping means in said conduit, means to vary the speed of said pumping means, and means to control said last mentioned means including means whereby to progressively vary in a multiplicity of steps the speed of said pumping means at a relatively slow rate upon relatively small variations and in accordance with the direction of variation in the quantity of fluid in said receiver with respect to said normal quantity, associated means whereby to progressively vary in a multiplicity of steps the speed of said pumping means at a relatively fast rate upon relatively large variations in the quantity of fluid in said receiver with respect to said normal quantity, and associated means substantially immediately responsive to reversal in the direction of variation in the quantity of fluid in said receiver whereby to maintain the speed of said pumping means at its instant value pending further variation in the quantity of fluid in either direction with respect to said normal quantity.

6. In a fluid flow controlling system of the character described, the combination with a conduit for conducting a varying flow of fluid, of a storage receiver interposed in said conduit, variable delivery pumping means in said conduit for controlling the flow of fluid through said receiver, means operable automatically to effect in a continuous multiplicity of steps a progressive variation in the rate of delivery of said pumping means throughout a given range upon a predetermined degree and in accordance with the direction of variation in the quantity of fluid in said receiver relative to a normal quantity, and means associated with said automatically operable means to enable the latter to differentiate between relatively slow and relatively rapid variations in the quantity of fluid in said receiver, whereby the time required to vary the rate of delivery of said pumping means to compensate for said relatively rapid variations is minimized.

7. In a liquid flow controlling system, in combination, a storage receiver for containing a liquid, said receiver having an inflow conduit and an outflow conduit, a variable delivery pump in one of said conduits, means to vary the rate of delivery of said pump, means to control said last mentioned means including means responsive to variations in the level of the liquid in said receiver whereby to progressively increase or to progressively decrease in a multiplicity of steps the rate of delivery of said pump in accordance with the direction of variation in the level of the liquid relative to a normal level, and associated means substantially instantaneously responsive to reversal in the direction of variation in the level of the liquid whereby to maintain the instant rate of delivery of said pump pending further variation in the level of the liquid in the previous direction or departure thereof from said normal level in the opposite direction.

8. In a liquid flow controlling system, in combination, a storage receiver for containing a liquid and having an inflow conduit and an outflow conduit, a variable delivery pump in one of said conduits, means to vary the rate of delivery of said pump in accordance with variations in the level of the liquid in said receiver relative to given normal limits and to given outer limits, respectively, said last mentioned means including means responsive to variations in the level of the liquid in said receiver and adapted to progressively vary in a multiplicity of steps the rate of delivery of said pump upon and in accordance with the direction of variation in the level of the liquid beyond said normal limits, associated means operable upon departure of the liquid level beyond either of said normal limits to effect a relatively slow variation in the rate of delivery of said pump, associated means operable upon departure of said liquid level beyond either of said outer limits to effect a relatively fast variation in the rate of delivery of said pump, and associated means substantially instantaneously responsive to reversal in the direction of variation in the level of the liquid in said receiver to at least temporarily maintain the instant rate of delivery of said pump.

9. In a liquid flow controlling system, in combination, a storage receiver for containing a liquid and having an inflow conduit and an outflow conduit, a variable delivery pump in one of said conduits, means to vary the rate of delivery of said pump, means to control said last mentioned means including means whereby to progressively vary in a multiplicity of individually timed steps the rate of delivery of said pump upon variation in the level of the liquid in said receiver relative to a normal level, said last mentioned means including a float operated switch responsive to variations in the level of the liquid in said receiver, a second float operated switch substantially immediately responsive to reversals in the direction of variation in the level of the liquid in said receiver, and means controlled by said float switches to increase or to decrease the rate of delivery of said pump upon and in accordance with the direction of variation in the level of the liquid in said receiver with respect to said normal level, said last mentioned means including means to at least temporarily maintain the instant rate of delivery of said pump upon reversal in the direction of variation in the level of the liquid in said receiver.

10. In a liquid flow controlling system, in combination, a storage receiver for containing a liquid and having an inflow conduit and an outflow conduit, a variable delivery pump in one of said conduits, a variable speed motor for driving said pump to vary the rate of delivery thereof, means to control said motor including a float operated switch responsive to variations in the level of the liquid in said receiver, said switch being ineffective to control said motor when the level of the liquid is within given limits and being effective to progressively increase or to progressively decrease the speed of said motor upon and in accordance with the direction of variation in the level of the liquid beyond said limits, and a second float operated switch substantially immediately operable upon reversal in the direction of variation in the level of the liquid to maintain the instant speed of said motor pending further variation in the level of the liquid in either direction with respect to said limits.

11. In a liquid flow controlling system, in combination, a storage receiver for containing a liquid, said receiver having a supply conduit for conducting a varying flow of liquid to said receiver and a discharge conduit, means to control the flow of liquid in said discharge conduit in accordance with variations in the level of the liquid in said receiver relative to a normal level, said means comprising a variable delivery pump, means to vary the rate of delivery of said pump comprising a variable speed motor, and control means to vary the speed of said motor in a multiplicity of individually timed steps, said control means being adapted to progressively increase the speed of said motor upon a predetermined degree of rise of the liquid level above said normal level and to progressively decrease the speed of said motor upon a predetermined degree of lowering of the liquid level below said normal level, said control means including means operable substantially instantaneously whereby to at least temporarily maintain the instant speed of said motor upon reversal in the direction of variation in the liquid level.

12. In a liquid flow controlling system, in combination, a storage receiver for containing a liquid, a supply conduit for conducting liquid to said receiver and a discharge conduit for conducting liquid from said receiver in response to a varying demand, means for controlling the flow of liquid in said supply conduit in accordance with variations in the level of the liquid in said receiver relative to a normal level, said means comprising a variable delivery pump, means to vary the rate of delivery of said pump comprising a variable speed motor, and control means to vary the speed of said motor in a multiplicity of individually timed steps, said control means being adapted to progressively increase the speed of said motor upon a predetermined degree of lowering of the liquid level below said normal level and to progressively decrease the speed of said motor upon a predetermined degree of rise of the liquid level above said normal level, said control means including means operable substantially instantaneously whereby to at least temporarily maintain the instant speed of said motor upon reversal in the direction of variation in the liquid level.

13. In a liquid flow controlling system, in combination, a storage receiver for containing a liquid and having an inflow conduit and an outflow conduit, a variable delivery pump in one of said conduits, means to vary in a multiplicity of steps the rate of delivery of said pump in accordance with variations in the level of the liquid in said receiver relative to a normal level, said means comprising a plurality of variable speed motors of different speed ranges, respectively, and control means for said motors including means to render the same effective individually in a predetermined sequence to drive said pump upon given durations and/or degrees of unidirectional variation in the level of the liquid from said normal level, means to progressively vary the speed of the active motor in accordance with the direction of variation in the level of the liquid from said normal level, and associated means operable substantially instantaneously to maintain the instant speed of the active motor upon reversal in the direction of variation in the level of the liquid pending further variation in said level in either direction with respect to said normal level.

14. In a liquid level controlling system of the character described, in combination, a storage receiver for containing a liquid, a supply conduit for conducting liquid to said receiver, a discharge conduit for conducting liquid from said receiver, a variable delivery pump in one of said conduits, means to vary the rate of delivery of said pump in accordance with variations in the level of the liquid in said receiver relative to a normal level, said means comprising a plurality of variable speed motors of different speed ranges for driving said pump, and control means for said motors including means to render the same effective individually in a predetermined sequence to operate said pump upon given durations and/or degrees of unidirectional variation in the level of the liquid from said normal level, means to effect transfer of pump operation from one motor to another at substantially like speeds, means to progressively vary in a multiplicity of steps the speed of the active motor throughout a predetermined range in accordance with the direction of variation in the level of the liquid from said normal level, and associated means operable substantially instantaneously to maintain the instant speed of the active motor upon reversal in the direction of variation in the level of the liquid pending further variation in the level of the liquid with respect to said normal level in either direction.

15. In a sewage flow controlling system of the character described, the combination with a tank for receiving liquid sewage, of a conduit for supplying to said tank a flow of sewage which is inherently subject to relatively wide variations and a conduit for discharging sewage from said tank, a variable delivery pump in said discharge conduit, means to vary the rate of delivery of said pump to control the flow of sewage through said discharge conduit at a rate substantially corresponding to the rate of flow thereof through said supply conduit, said means comprising at least two variable speed motors of different speed ranges, respectively, for operating said pump, control means for said motors to render the same effective individually in a predetermined sequence to operate said pump and including a float responsive to variations in the level of the liquid in said tank, said control means being operable automatically upon a given degree of rise in the liquid level above a predetermined level to effect operation of one of said motors at a predetermined slow speed, said control means being operable upon sustention of said liquid level above said predetermined level or upon further rise thereof to effect a progressive step by step increase in the speed of said motor throughout a predetermined range, said control means being thereafter operable to effect transfer of pump operation from said motor to another of said motors at predetermined substantially like speeds and to effect a progressive step by step increase in the speed of the latter, said control means also being operable automatically upon a given degree of lowering of the liquid level below said predetermined level to effect a progressive step by step decrease in the speed of the active motor, said control means being thereafter operable upon sustention of said liquid level below said predetermined level or upon continued lowering thereof to effect a further progressive step by step decrease in the speed of the active motor, to effect transfer of pump operation from one to another of said motors at predetermined substantially like speeds and to effect deenergization of said first mentioned motor to stop said pump, and means associated with said control means to enable the latter to maintain the instant speed of the active motor upon reversal in the direction of variation in the level of the liquid pending further variation in the liquid level in either direction with respect to said predetermined level.

16. In a sewage flow controlling system of the character described, the combination with a tank for receiving liquid sewage, of a conduit for discharging sewage from said tank at a rate corresponding to the rate of demand therefor and a conduit for supplying sewage to said tank, a variable delivery pump in said supply conduit, means to vary the rate of delivery of said pump to control the flow of sewage through said supply conduit at a rate substantially corresponding to the rate of flow thereof through said discharge conduit, said means comprising at least two variable speed motors of different speed ranges, respectively, for operating said pump, control means for said motors to render the same effective individually in a predetermined sequence to operate said pump and including a float responsive to variations in the level of the liquid in said tank, said control means being operable automatically upon a given degree of lowering of the liquid level below a predetermined level to effect operation of one of said motors at a predetermined slow speed, said control means being operable upon sustention of said liquid level below said predetermined level or upon further lowering thereof to effect a progressive step by step increase in the speed of said motor throughout a predetermined range, said control means being thereafter operable to effect transfer of pump operation from said motor to another of said motors at predetermined substantially like speeds and to effect a progressive step by step increase in the speed of the latter, said control means also being operable automatically upon a given degree of rise of the liquid level above said predetermined level to effect a progressive step by step decrease in the speed of the active motor, said control means being thereafter operable upon sustention of said liquid level above said predetermined level or upon further rise thereof to effect a continued progressive step by step decrease in the speed of the active motor, to effect transfer of pump operation from one to another of said motors at predetermined substantially like speeds and to effect deenergization of said first mentioned motor to stop said pump, and means associated with said control means to enable the latter to maintain the instant speed of the active motor upon reversal in the direction of variation in the level of the liquid pending further variation in the liquid level in either direction with respect to said predetermined level.

17. In a liquid flow controlling system, in combination, a storage receiver for containing a liquid and having an inflow conduit and an outflow conduit, a variable delivery pump in one of said conduits, means to vary the rate of delivery of said pump including two variable speed motors of different speed ranges, respectively, control means for said motors operable automatically to control the speeds of the latter whereby to effect a progressive variation in the rate of delivery of said pump upon a predetermined degree and in accordance with the direction of variation in the level of the liquid in said receiver relative to a normal level, and associated means operable to render said motors effective individually in a predetermined sequence whereby upon attainment of a given speed of the motor of lesser speed range during increase in the speed thereof transfer of pump operation is adapted to be effected at said given speed to the motor of greater speed range, said last mentioned means including means operable upon attainment of another given speed of said last mentioned motor during decrease in the speed thereof to effect transfer of pump operation at said latter given speed to said first mentioned motor, for the purpose set forth.

18. In a liquid flow controlling system, in combination, a storage receiver for containing a liquid and having an inflow conduit and an outflow conduit, a variable delivery pump in one of said conduits, means to vary the rate of delivery of said pump including two variable speed motors of substantially like minimum speeds and different maximum speeds, respectively, control means for said motors operable automatically to control the speeds of the latter whereby to effect progressive variation in the rate of delivery of said pump upon a predetermined degree and in accordance with the direction of variation in the level of the liquid in said receiver relative to a normal level, said last mentioned means including control means for the motor of lesser maximum speed whereby to provide for starting thereof at its minimum speed and to provide for progressive variation in the speed thereof throughout its total range, associated means operable normally during increase in the rate of delivery of said pump and adapted to effect transfer of the operation of said pump from the motor of lesser to the motor of greater maximum speed at a speed corresponding to the maximum speed of the former, associated means operable normally during decrease in the rate of delivery of said pump and adapted to effect transfer of the operation thereof from the motor of greater to the motor of lesser maximum speed at a speed less than the maximum speed of the latter, and control means for the motor of greater maximum speed to normally provide for operation and progressive variation in the speed thereof between said last mentioned transfer speed and its maximum speed.

19. In a liquid flow controlling system, in combination, a storage receiver for containing a liquid and having an inflow conduit and an outflow conduit, a variable delivery pump in one of said conduits, means to vary the rate of delivery of said pump including two variable speed motors of substantially like minimum speeds and different maximum speeds, respectively, control means for said motors operable automatically to control the speeds of the latter whereby to effect progressive variation in the rate of delivery of said pump upon a predetermined degree and in accordance with the direction of variation in the level of the liquid in said receiver relative to a normal level, said last mentioned means including control means for the motor of lesser maximum speed whereby to provide for starting thereof at its minimum speed and progressive variation in the speed thereof throughout its total range, associated means operable normally during increase in the rate of delivery of said pump and adapted to effect transfer of the operation of said pump from the motor of lesser to the motor of greater maximum speed at a speed corresponding to the maximum speed of the former, associated means operable normally during decrease in the rate of delivery of said pump and adapted to effect transfer of the operation thereof from the motor of greater to the motor of lesser maximum speed at a speed less than the maximum speed of the latter, and control means for the motor of greater maximum speed to normally provide for operation and progressive variation in the speed thereof between said last mentioned transfer speed and its maximum speed, said last mentioned means including means operable upon failure of the control means for the motor of lesser maximum speed to provide for operation and progressive variation in the speed of the motor of greater maximum speed throughout its total range.

JOHN L. DEFANDORF.
ROBERT O. PERRINE.